United States Patent [19]
Lee

[11] Patent Number: 5,666,469
[45] Date of Patent: Sep. 9, 1997

[54] METHOD FOR GENERATING SOLUTIONS FOR SEQUENCING PROBLEMS

[75] Inventor: Ho Soo Lee, Mount Kisco, N.Y.

[73] Assignee: International Business Machines Corporation, Armonk, N.Y.

[21] Appl. No.: 384,979

[22] Filed: Feb. 7, 1995

[51] Int. Cl.$^6$ .................................................. G06F 17/00
[52] U.S. Cl. ................................................ 395/51; 395/50
[58] Field of Search ............................. 364/402; 395/51, 395/904, 906, 50, 60–61, 10–11

[56] References Cited

U.S. PATENT DOCUMENTS

| | | | |
|---|---|---|---|
| 5,067,166 | 11/1991 | Ito | 382/37 |
| 5,146,540 | 9/1992 | Natarajan | 395/11 |
| 5,228,115 | 7/1993 | Natarajan | 395/51 |
| 5,249,261 | 9/1993 | Natarajan | 395/51 |
| 5,467,268 | 11/1995 | Sisley et al. | 364/401 |

OTHER PUBLICATIONS

Bipso, C.F.G., et al. "Adaptive Scheduling for High-Volume Shops", IEEE Transactions on Robotics and Automation, vol. 8, No. 6, pp. 696–706 Dec. 1992.

Shih, H.M., et al., "Beam Search Based Delivery Scheduling System", 1992 International Symposium on Industrial Electronics, pp. 744–748 1992.

Shih, H.M., et al., "A Timed Petri Net and Beam Search Based On-Line FMS Scheduling System with Routing Flexibility", Proceedings of the 1991 IEEE International Conference on Robotics and Automations, pp. 2548–2553 Apr. 1991.

Lee, Ho Soo, "Solving N–ary Constraint Labeling Problems Using Incremental Subnetwork Consistency", 1991 Conference on Artificial Intelligence Applications, pp. 345–351 1991.

Freuder, E.C., "Synthesizing Constraint Expressions", Communications of the ACM, vol. 21, No. 11, pp. 958–966 Nov. 1978.

Haralick, R.M., "Increasing Tree Search Efficiency for Constraint Satisfaction Problems", Artificial Intelligence, vol. 14, pp. 263–313 Oct. 1980.

Mackworth, A.K., "Consistency in Networks of Relations", Artificial Intelligence, vol. 8, pp. 99–118 Feb. 1977.

Knuth, D.E., "Estimating the Efficiency of Backtrack Programs", Mathematics of Computation, vol. 29, #129, pp. 121–136 Jan. 1975.

*Primary Examiner*—Tariq R. Hafiz
*Attorney, Agent, or Firm*—Whitham, Curtis, Whitham & McGinn; Stephen C. Kaufman

[57] ABSTRACT

A method for generating solutions for sequencing problems of a type that can develop in artificial intelligence or operation research. The method includes the steps of finding multiple sets of subsequences of near optimal quality for a given finite number of n items wherein each item has a set of attributes and wherein there exists a set of constraints and objectives defined on the n items; and satisfying the constraints simultaneously such that the number of subsequences is a minimum.

2 Claims, 7 Drawing Sheets

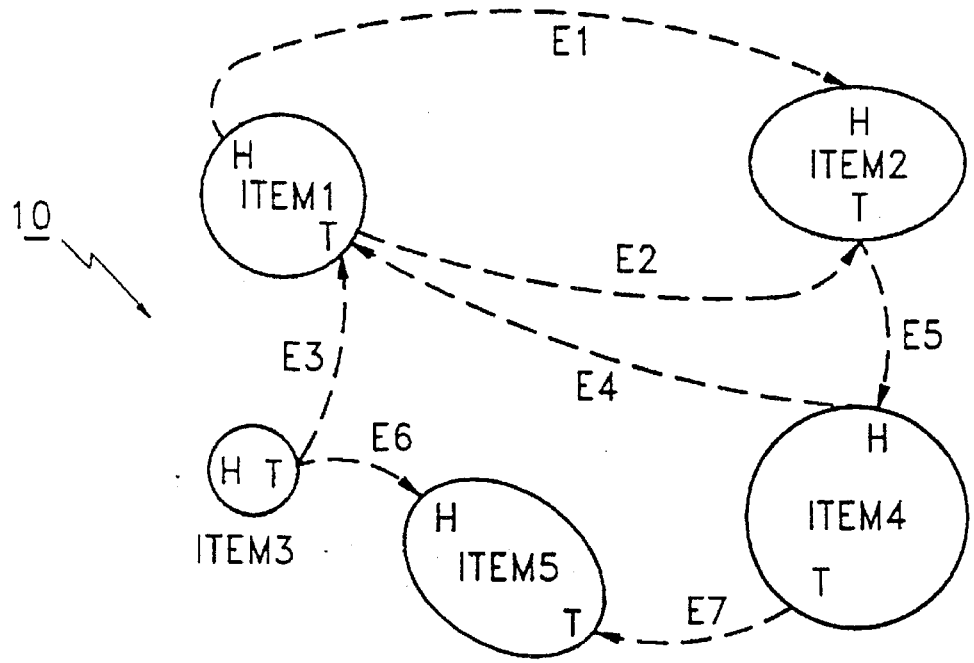
FIG. 1
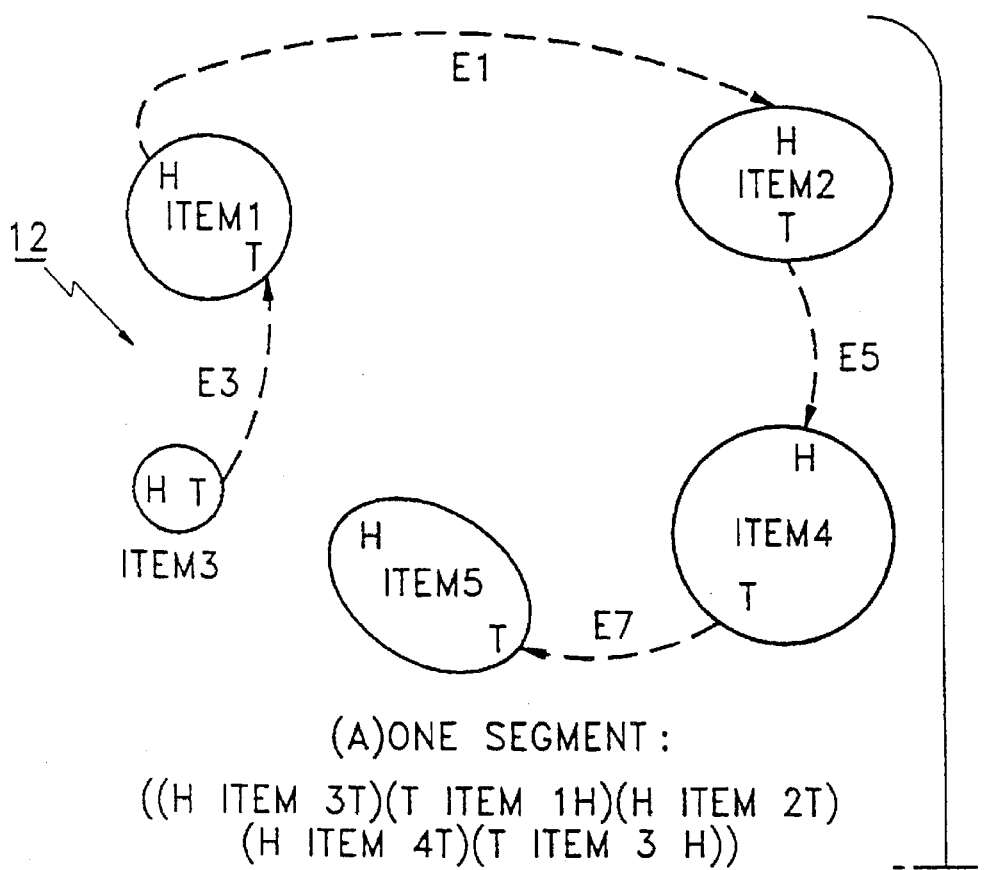
(A) ONE SEGMENT:
((H ITEM 3T)(T ITEM 1H)(H ITEM 2T)
(H ITEM 4T)(T ITEM 3 H))

(B) TWO SEGMENTS
((T ITEM 4 H) (T ITEM 1 H) (H ITEM 2 T))
((H ITEM 3 T) (H ITEM 5 T))

(C) THREE SEGMENTS
((H ITEM 1 T)(T ITEM 2 H))
((H ITEM 4 T)(T ITEM 5 H))
ITEM 3

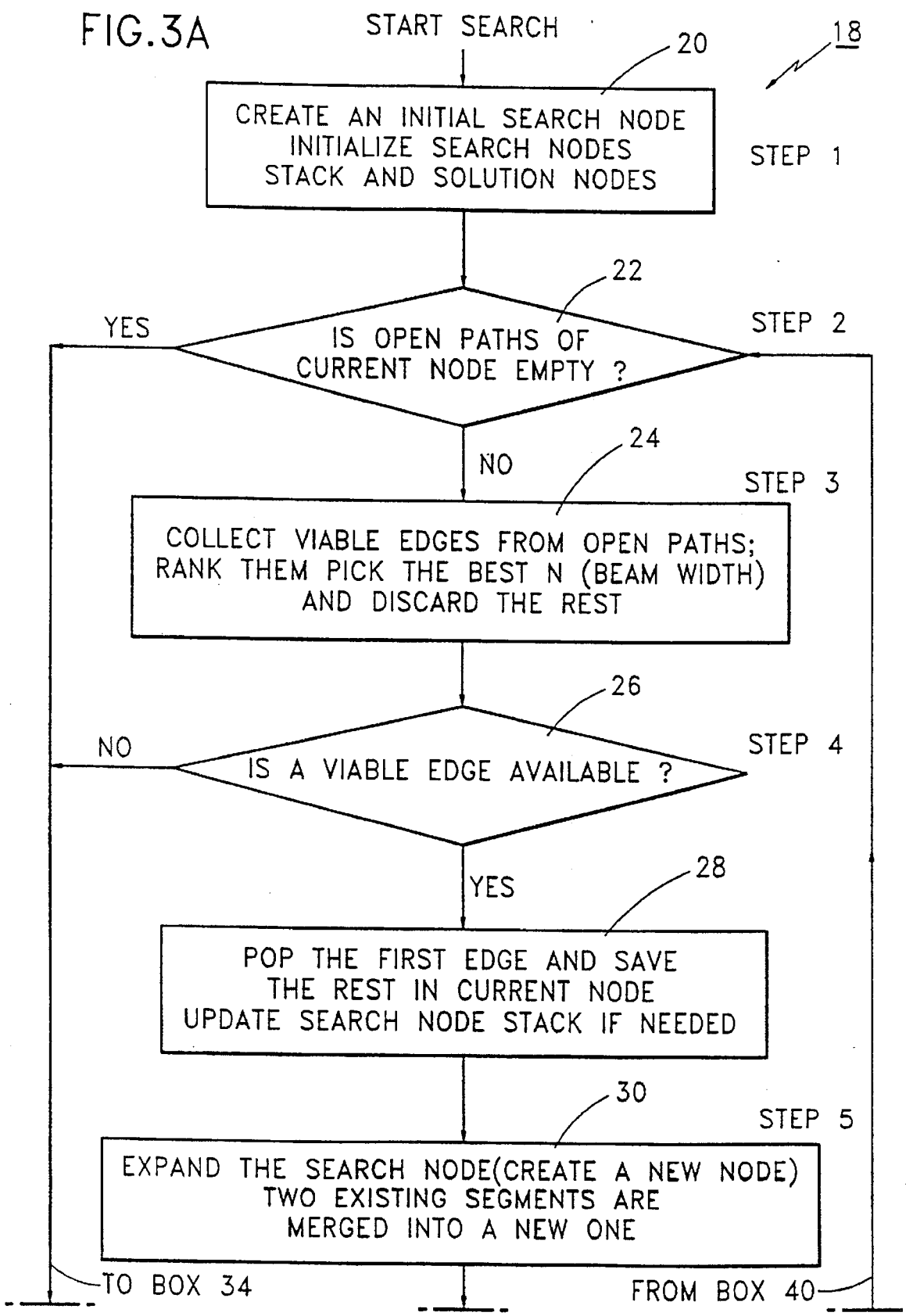

METHOD FOR GENERATING SOLUTIONS FOR SEQUENCING PROBLEMS

FIELD OF THE INVENTION

This invention relates to a method for generating a novel solution for a specified sequencing problem.

INTRODUCTION TO THE INVENTION

Our work relates to generating solutions to sequencing problems of a type that can develop for example in the areas comprising artificial intelligence or operations research. Sequencing problems in these areas are particularly challenging, since most sequencing problems are combinatorial problems, and in industrial sequencing problems of realistic dimension, the size and complexity of the problem can render existing search algorithms or optimal solution techniques, such as mathematical programming, computationally impracticable.

Furthermore, many industrial sequencing problems are not clearly defined in terms of constraints and objectives: the constraints and objectives may be general functions of a number of parameters, or can only be expressed in an abstract manner. We can find many such examples in industrial production scheduling problems.

In these kinds of industrial sequencing problems, moreover, we often can not find feasible solutions satisfying all given constraints. However, we note that even under such circumstances, we may still hope to find a set of subsequences (we call them segments later), where each subsequence satisfies the constraints. For many of those problems, accordingly, finding optimal solutions is not necessarily a major concern; rather, it would be more important to get near-optimal solutions in a reasonable amount of time, say ten minutes, instead of several hours. Otherwise, rescheduling, which is frequently demanded, is practically impossible.

SUMMARY OF THE INVENTION

Among the many different sequencing problems, the one which is the direct subject of the present invention may be characterized as follows: For a given finite number of n items, each with associated attributes, and a set of constraints and objectives defined on generic items, find a near-optimal sequence of the items satisfying the constraints simultaneously.

For solutions of this sequencing problem, the literature lists a few generally accepted methods for searching possible sequences. Although some of these methods build upon each other, each doing a slightly more intelligent search to prune some of the possibilities earlier, they are basically variable-labeling search algorithms. In this approach, this sequencing problem can be formulated as follows: We are given (1) a finite set of n variables, $v_1, v_2, \ldots, v_n$, each with an associated finite discrete domain, $D_1, D_2, \ldots, D_n$, and (2) a set of constraints and objectives. If we have five items, for example, the initial elements of domain $D_i$ are all the five input items. The goal is to label or assign values to variables, satisfying the given constraints simultaneously, while optimizing the objectives. Since each value of a variable is an item, listing those values starting the first variable produces a sequence. Note that often it may not be possible to find values for all variables.

We now set forth and analyze sundry variable-labeling algorithms for industrial problems in anticipation of highlighting, contrasting and defining the novel method of the present invention.

Sequencing by Labeling Variables

The variable-labeling algorithm is basically a sequential algorithm that uses the standard backtrack tree search. Backtracking is a method of solving problems by sequentially instantiating domain values, and at each addition checking the partial solution to assure it does not violate any of the constraints. (See "Estimating the efficiency of backtracking programs", Knuth, D., Mathematics of Computation 29, No. 129, pp. 121–136, 1975.)

While variables may be instantiated in an arbitrary order, suppose for this discussion that they are instantiated in the order of their indices, with variables having lower indices tried first. For each instantiation of a new current variable $v_i$, a partial solution is checked against the constraints/objectives involving all or part of its variables in order to see if this partial solution (corresponding branch of the search tree) satisfies the constraints. If satisfied, then the branch is extended by instantiating the next variable $v_{i+1}$. Otherwise, another value in the current variable's domain $D_i$ is tried. During the search, if $D_i$ becomes empty, the partial value assignment of the past variables cannot be a solution, since no consistent values remain in all other domains, backtracking goes back to the most recently instantiated past variable with unassigned values remaining in its domain to re-instantiate it with its next value.

Thus, the algorithm generates partial solutions and builds upon them, until (a) a solution is found, or (b) the solution is proven infeasible, at which point it backtracks.

This basic backtrack search algorithm guarantees finding solutions if they exist. However, it exhibits a behavior known as thrashing, since it repeatedly rediscovers the same constraint violations, and finds failures late in the search, which increases the amount of backtracking that is previously done. The time taken to find a solution grows exponentially in the number of variables (See "Consistency in networks of relations", Mackworth, A. K., Artificial Intelligence 8, pp. 99–118, 1977 and Constraint Satisfaction in Logic Programming, Van Hentenryck, P., The MIT Press, 1989).

Hybrid algorithms were introduced to improve the performance of the backtrack search, by avoiding such a thrashing behavior (See "Increasing tree search efficiency for constraint satisfaction problems", Haralick R. M. and Elliott, G., Artificial Intelligence 14, pp. 263–313, 1980).

Hybrid algorithms combine the backtrack search with domain reduction algorithms to prune the search space more quickly. Their common approach is, for a new instantiation of a current variable, to prune the tree search space as much as possible by eliminating all inconsistent values from the domains of future variables, prior to continuation of the backtrack search. Its runtime performance is much better than the standard backtrack tree search, but we note that this algorithm still has a deficiency, due to the requirement of an enormous amount of memory space, especially when there are no feasible solutions.

To summarize, even the best variable-labeling algorithm is not enough for solving the industrial sequencing problem as defined above. In the next section, we list the shortcomings of the sequencing algorithms by labeling variables.

Problems in Variable-Labeling Algorithms

For the industrial sequencing problems, the variable-labeling algorithms have been taken as the primary approach for generating solutions. However, as partly discussed above, it is as yet difficult to get solutions for the following reasons.

Problem 1: No Feasible Solutions May Exist

We normally do not have a prior knowledge whether or not a problem has feasible solutions. Therefore, in the situation where it has none, the search will continue for a long time with a huge amount of backtracking, thus exhibiting the thrashing behavior. In general, in such a case, it is not uncommon to take several hours or days until the search is terminated. Due to this problem, many industries can generate only a two or three-day schedule, although their initial goal is to get a one-week schedule.

This phenomenon suggests to us employing search techniques that are insensitive to the existence of feasible solutions. Furthermore, it is desirable to be able to generate a set of subsequences even if no feasible global sequence is available.

Problem 2: Sequential Assignment is Expensive

The variable-labeling is a sequential algorithm. At the outset of the search at the root node, we have (n−1) choices. Then, on the first level, we have (n−2) values to choose from. On the k-th level, we have (n−k) choices. Hence, on the k-th level, the number of plausible search tree combinations is (n−1)×(n−2) x..x(n−k). The size of combinations grows exponentially as the search level is increased. Hence, when n is large, as can be seen in real-world problems, we need prohibitively large memory space and time for the search. This thrashing behavior becomes worse if a significant amount of backtracking occurs to follow different search paths.

We prefer a search technique that does not demand exponential increase of space/time with the growth of the search level.

Problem 3: Navigation of Search Space is Slow

In real-world operations, we often want different scheduling sequences. For example, we may need a production sequence which makes the total tardiness minimum, or a sequence of minimum production cost, etc. So, it is often preferred to get a number of different solutions from which we may choose an appropriate one.

In the variable-labeling algorithms, when a variable is instantiated, the instantiations of previous variables up to the parent of the current variable are all the same; only the values of the current variable differ.

Therefore, moving around the search space is very slow. In addition, if a solution spot is far from the present point in the search space, it would take a great amount of search time to reach the vicinity of the solution.

Problem 4: Sequences are Sensitive to the Order of Labeling

In the variable-labeling algorithms, when a variable is assigned a value the search tree is expanded. Once an assignment is made, the value will not be changed until the search backtracks up to this point. No mechanism is available for recovering previous possible mistakes. As a result, the search result is sensitive to the order of variable labeling; an attempt to changing labels requires very expensive operations.

This shortcoming suggests a need to find search algorithms which can produce the same search results without regard to the order of labeling.

Motivation to Invention

The problems described above challenge us to find a more efficient and robust search methodology. The invention that will be presently defined resolves the following four issues:

1. We still want to get solutions (subsequences) for the problems with no feasible solutions.

2. We want to avoid the thrashing behavior exhibited when ,assigning values to variables in a sequential manner; it takes too much computational resources due to a great amount of backtracking.

3. We often need to find many different solutions in a short time.

4. We need a robust search algorithm whose solutions are insensitive to the order of labeling.

As a solution for the shortcomings of the variable-labeling algorithms presented above, we have now developed a novel method comprising an edge-labeling sequencing technique. The goal of the novel method is to quickly generate near-optimal solutions, even in the case where no feasible solutions exist.

To this end, accordingly, we now define a novel method, which method comprises the steps of:

1) finding multiple sets of subsequences of near optimal quality for a given finite number of n items wherein each item has a set of attributes and wherein there exists a set of constraints and objectives defined on the n items; and 2) satisfying the constraints simultaneously such that the number of subsequences is a minimum.

The novel method can realize several important and significant advantages. For example, the novel method has a capability for quickly finding near-optimal solutions for real-world sequencing problems. For a problem with no feasible solutions, the novel method can still generate reasonable solutions.

The novel method, moreover, can subsume capabilities and advantages, to be specified in detail below, comprising inter alia:

1. Providing a methodology for quickly finding multiple feasible and near optimal sequences, satisfying all constraints.

2. Providing methodologies for obtaining substantially different solutions by exploiting a beam search technique.

3. Providing methodologies for obtaining substantially different solutions by exploiting a beam search technique.

4. Providing methodologies for using the beam search without deteriorating the quality of the subsequences by exploiting a property that segments are insensitive to the order of edge linking.

5. Providing methodologies for successively applying the same sequencing algorithm to problems whose problem dimension are too big to get solutions with a single application of the search algorithm.

6. Providing methodologies for development of a fast sequencing software tool.

BRIEF DESCRIPTION OF THE DRAWINGS

The invention is illustrated in the accompanying drawings, in which:

FIG. 1 shows an example of a configuration of initial items in a segment graph;

FIGS. 3A and 3B, taken together are a flow chart of an edge-labelling search algorithm;

DETAILED DESCRIPTION OF THE INVENTION

Finding a set of subsequences comprises two steps: first, items are preferably preprocessed, creating a segment graph with consistent edges, and second, the edges in the segment graph preferably are labeled by the algorithm. We preferably label each edge as 0 (discarded) or 1 (selected). When all edges are exhausted for labeling, we then have a final set of segments.

Segment Graphs

The input to the edge-labeling technique is a set of items; each may have attributes, constraints and objectives. An item may have directional attributes such that only one direction is legitimate. For example, when we have an item that comprises a set of steel slabs with different widths, their production must follow the rule that they are produced from wide to narrow ones. Since we sometimes need to distinguish one end of an item from the other, we preferably label them Head and Tail. In case the two ends are indistinguishable, Head and Tail can be arbitrarily assigned.

With the input items and the constraints, we build a segment graph, in which the input items preferably become nodes, and any two items which do not violate any relevant constraints are linked by an edge. There may be a number of constraints defined between two items, or often over many items. Edges may be directed. An example is shown in FIG. 1 (numeral 10), where we have five nodes (items) and seven edges, $E_1, E_2, \ldots, E_7$. "H" and "T" in the items stand for Head and Tail, respectively. The edges shown in the segment graph are yet to be labeled either 0 or 1. Labeling an edge either 0 or 1 partitions the solution search space into two: one portion including solutions with the edge and the other portion including solutions without it.

The edge-labeling algorithm results in a set of segments or subsequences. A segment is basically an ordered set of items. To take a uniform treatment, we preferably regard a raw item as a segment; so, initially, every item is a segment. A segment, like an item, has its own attributes and Head/Tail.

Figure 2:
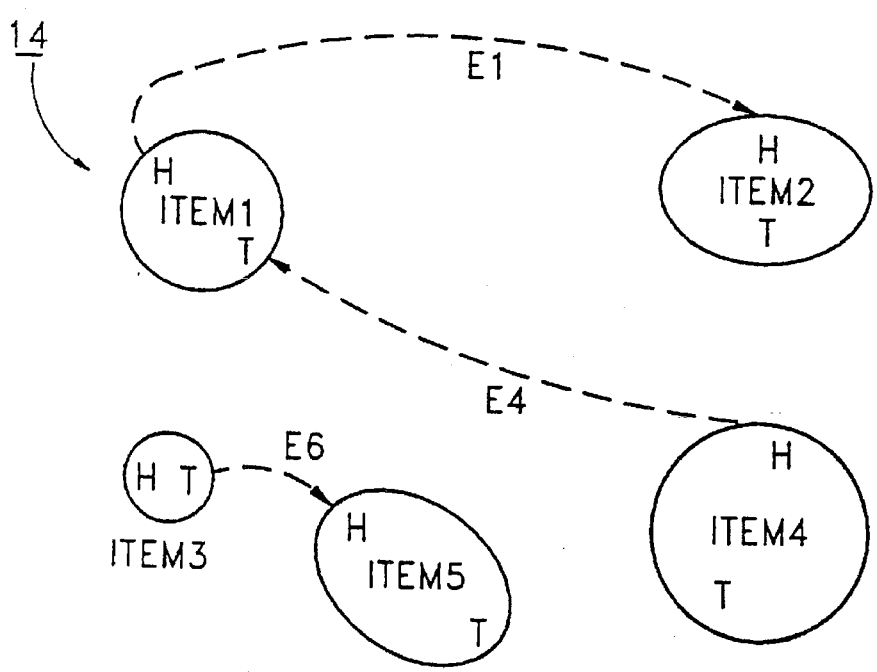
FIGS. 2A, 2B and 2C show examples of how three different sequence sets can be produced from the same sequence.
Figure 2:
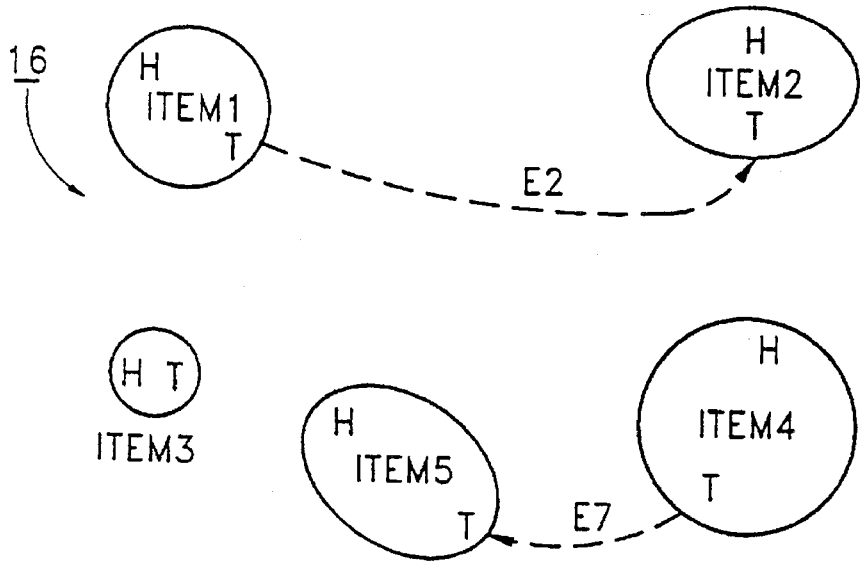

During the search process a new segment may be dynamically created by concatenating any two existing segments linked by an edge. For example, from the initial segment graph in FIG. 1, if we choose edge $E_1$ among several others, we can create a new segment ((T Item1 H) (H Item2 T)). (Here, in order to represent directions, we use the triple format; it indicates that the head of Item1 is linked with the head of Item2; therefore, the tail of Item1 and the tail of Item2 become the tail and head of the newly created segment.) Now, if we choose $E_4$, the two existing segments ((T Item1 H)) (H Item2 T)) and Item4, or more precisely (T Item4 H), are concatenated into a new segment ((T Item4 H) (T Item1 H) (H Item2 T)). It is indeed one segment, as shown in FIG. 2(B). When the final segment set contains a single segment, it is a global sequence we are looking for; otherwise, each member of the set corresponds to a subsequence.

A segment graph is usually very sparse because of many constraints among the nodes. The segment graph in FIG. 1 would be a typical one. This is the difference between the problems we are dealing with and the optimization problems such as the symmetrical traveling salesman problems (See "The Traveling Salesman Problem: A Guided Tour of Combinatorial Optimization", Lawler, E., Lenstra, J., Rinnooy, A., and Shmoys, D., 1985) where no constraints are imposed on edges.

At any moment during search, all items in a segment satisfy the constraints defined on them. In most cases, segments in a segment graph are to be merged to form segments as long as possible. Depending on the objectives, we may get different segment. As an example, refer to the three different segments sets in FIG. 2A (numeral 12), FIG. 2B (numeral 14), and FIG. 2C (numeral 16), and change "(a)" to FIG. 2A. In (a) we have one segment, which is often called Hamiltonian (See "Graph Algorithms", Even, S., Computer Science Press, 1979) and is a global sequence; in (FIG. 2B) we have two segments; in (FIG. 2C) we have three segments, where Item 3 does not belong to any non-trivial segment.

Details on Edge-Labeling Sequencing

At each level of the search, a search node is created, where each may have the following information:

Level search level (depth) starting from 0.

OpenPaths: a set of segments that may be further expanded.

ClosedPaths: a set of segments that cannot be expanded; initially, it is empty.

State state: of the search indicating which segments are viable for further concatentation of segments.

Edges: best viable edges for the current search level.

Figure 3B:
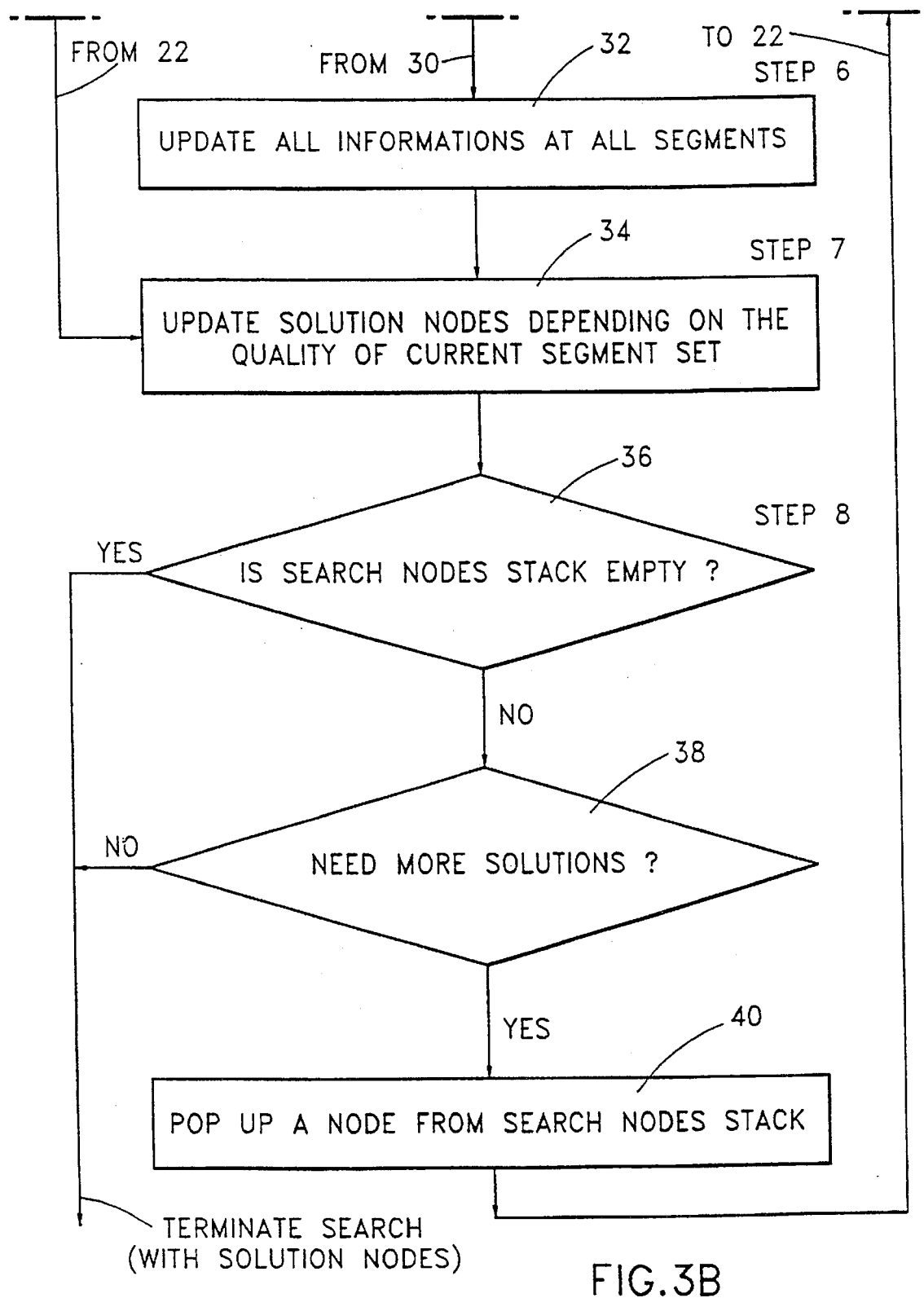

A representative flow chart of the edge-labeling algorithm is depicted in FIGS. 3A and 3B and a preferred detailed description of each step is given below:

Step 1: (function block 20) Create an initial search node (CurrentSearchNode). Initialize SolutionNodes and SearchNodesStack. All currently consistent edges in a segment graph are stored at CurrentSearchNode.Edges.

Step 2 (decision block 22): Find open and closed paths of CurrentSearchNode. Check if CurrentSearchNode-.OpenPaths is empty; if empty, go to Step 7; otherwise, continue to the next step.

Step 3 (function block 24): From the set of segments in the open paths, we collect all edges and rank them according to their merit that is evaluated by the segment graph structure as well as by the domain objective. From them we find out the best N edges, where N is the beam width, and save them in CurrentSearch-Node.Edges in sorted order.

Step 4 (decision block 26 and function block 28): If CurrentSearchNode. Edges is empty, then go to Step 7. Otherwise, pop the first (best) edge from Current-SearchNode.Edges. If CurrentSearchNode has non-empty edges, then push it on SearchNodesStack for future alternative search paths.

Step 5 (function block 30): Expand the search tree by creating a new search node. The selected edge concatenates two existing segments into one while creating a new segment.

Step 6 (function block 32): Information at all existing and the newly created segments are updated by constraint propagation.

Step 7 (function block 34): Get the aggregate size of the open and closed paths. If it is the smallest ever, set SolutionNodes to it; if it is the same as the smallest, then add it to SolutionNodes.

Depending on application problems, we may have different criteria for the bound. As an example, weighted sum of priorities, average of the due dates of items, etc. of the segments can be used together with the aggregate size.

Step 8 (decision block 36 and 38 and function block 40): If SearchNodesStack is empty, or we have a sufficient number of solutions, then exit. Otherwise, pop one from SearchNodesStack and go to Step 2.

Notes:
- The search process returns SolutionNodes. It is a collection of one or more search nodes, where each has a set of segments.
- SolutionNodes is used to keep the search nodes containing the best sequences found so far.
- While searching any search node with nonempty viable edges is stacked on SearchNodesStack for later use.
- In Step 2 if CurrentSearchNode.OpenPaths is empty, there is no need to continue the search because no two current segments can be linked together. In this case, a set of segments stored in CurrentSearchNode.ClosedPaths becomes the final segments.
- In Step 3 we evaluate a set of edges from possible edges at CurrentSearchNode.Edges in terms of predetermined criteria. For the purpose of evaluation, both domain-dependent and independent information is used. As problem-dependent evaluation merits, we may have the following:
  —aggregate sum of the merits of the two existing segments;
  —transition cost from one segment to the other.

Exploiting Beam Search (Step 3)

If the number of viable edges is more than BeamWidth, then only the best BeamWidth number of them are considered at the current level. In general, the variable-labeling search techniques may lose a chance of getting a good solution if a truly best node is not expanded due to the beam search. However, by taking advantage of the edge-labeling algorithm, we can find sequences which are insensitive to the order of edge selection. In other words, even though a second best edge, instead of the real best edge, is expanded at a search level, the real best one is usually selected on the next level.

In the sequencing by variable-labeling, one drawback of using the beam search is that we often miss a path in a node expansion which really is the best choice. As a result, a naive adoption of the beam search may yield a bad solution, or it may take a long time to find a good solution.

Figure 4:
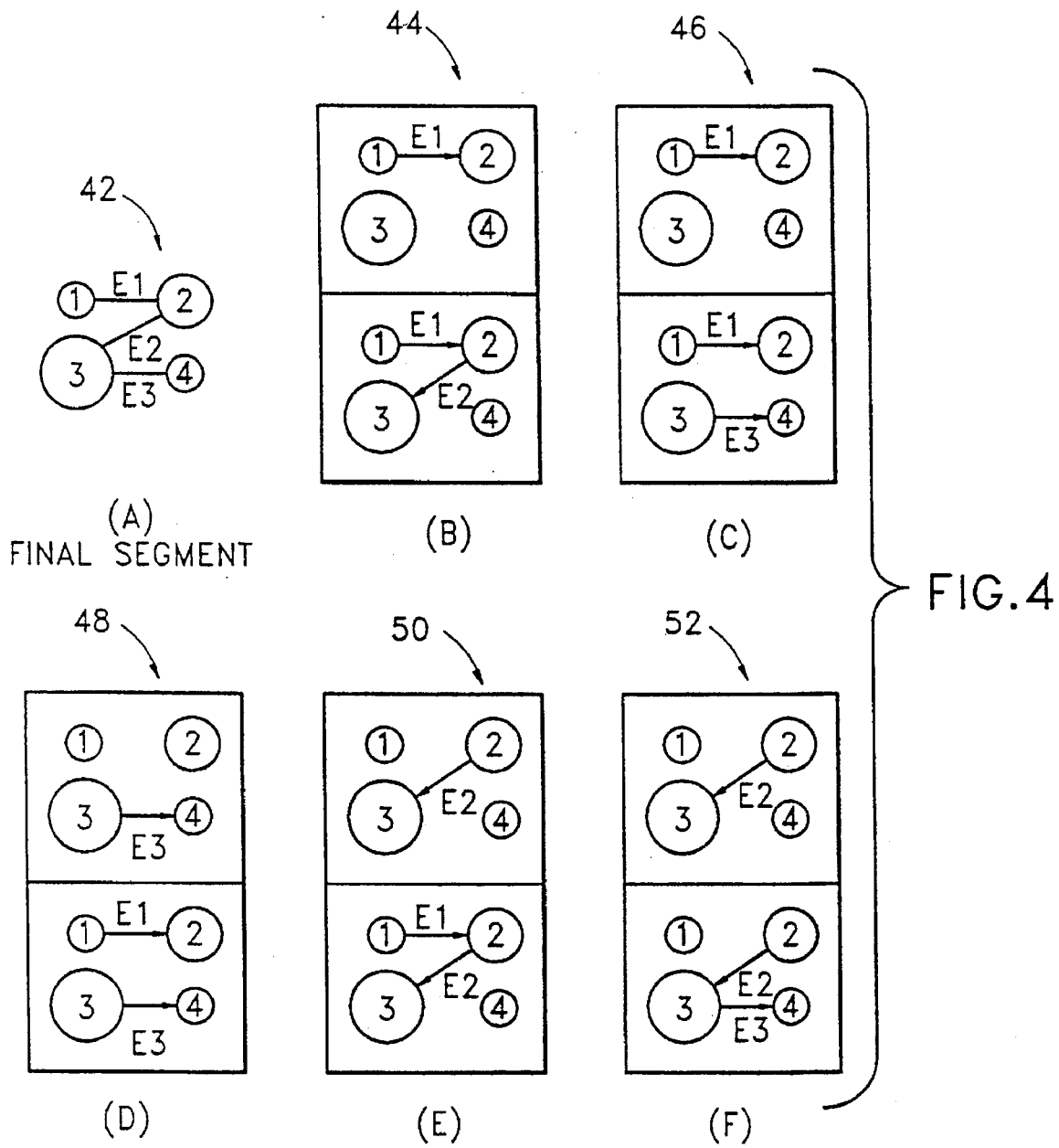
FIGS. 4A to 4F illustrate insensitivity to a linking order in an edge-labelling sequencing.

However, this drawback of the beam search can be avoided by using the edge-labeling technique. As an example, refer to FIG. 4 (numerals 42–52). The segment in (a) is the final segment: (1→2→3→4). The figures (b) to (f) show several different steps for generating the same final segment. As can be observed in those figures, we can get the same segment regardless of the steps.

Another benefit we can get by exploiting the beam search is that we can quickly navigate the search space. In the variable-labeling algorithm, in contrast, it is not possible to quickly move around the search space since we basically rely on backtracking. Although it is possible to use the beam search in this kind of search, as was addressed above, it is not possible to recover missing variable assignments once done. In the edge-labeling technique, however, unlike the variable-labeling one, it is possible without experiencing such a problem. By limiting the beam width, we can quickly move around the search space. As an extreme case, if we set the beam width to one, one search tree touching the leaf node gets just one solution. And the search tree should restart from the root of the search tree, making every solution quite different from the previous ones.

Evaluation of Sequences (Step 4)

In Step 4, the fact that CurrentSearchNode.Edges is empty means that no more viable edges to choose from are available; then we need to check if the search tree up to this point is a best one compared to the sequences obtained so far. All those sequences are placed in CurrentSearchNode.ClosedPaths. At this point (Step 7), we evaluate the quality of sequences according to the predetermined measure(s). The objective is to minimize the number of atomic segments, i.e., items, to minimize the number of segments, or to get a longest segment regardless of other criteria. If the quality of the newly created segments is comparable to the previous ones they are placed into SolutionNodes.

Expansion of Search Tree (Step 5)

When the search tree is expanded a new search node is created. In the new search node, two segments at CurrentSearchNode are always concatenated into a new one. Therefore, the number of segments in the new search node is one less than that of its parent search node. In general, if we start the search with N segments (the same as the number of original items), then it is reduced to N−k at the k-th search level (the level of the root node is 0).

When two existing segments are concatenated into a new segment the following subsequent events occur:
- We expand the edge-labeling search tree. A new search node is created to store intermediate information.
- A new segment is created.
- Linkable edges from the two existing segments and the new segment are updated.
- Attributes OpenPaths, ClosedPaths, and State at the new segment are revised.
- The next set of possible edges are found.

Pruning Search Space by Checking Constraints (Step 6)

After creating a new search node in Step 5, all existing edges are checked to see if they are still valid. Invalid ones are removed. We iterate this step until no further invalid ones are detected. Constraint propagation is effectively used in finding the termination of the search tree. Besides updating valid edges, all information relevant to the creation of the search node may be updated.

Backtracking or Terminating the Search (Steps 7 and 8)

As was stated, when CurrentSearchNode.Edges becomes empty, the search tree reaches a leaf node. Then we have two options:

Case 1: Termination

If we have obtained sufficient number of satisfactory solutions then just stop the search.

Case 2: Backtracking

If the sequence is unsatisfactory or we need more solutions, we continue the search along alternative paths. We refer to SearchNodesStack to see if it still have viable entries (search nodes) for the alternative paths (Step 8). If so, we get the topmost search node by popping up the stack, and backtrack to continue the search effort.

Sequencing with Many Input Items

When we are given too many input items for generating a sequence, we may need a huge amount of space to process. If our computing facility does not support it, we may perform an iterative edge-labeling, in which the set of resulting segments at k-th iteration becomes the input of (k+1)-th iteration.

We repeatedly apply the edge-labeling algorithm until the number of resulting segments becomes less than a certain predetermined value, or until no further sequencing is necessary.

This is a feature that ordinary variable-labeling search algorithms can not afford.

Experimental Results

As a vehicle for testing our algorithm, we attempted to solve a steel-mill scheduling problem and a synthetic steel scheduling problem.

The sequencing problem at continuous casting machines and hot strip rolling is known to be one of the hardest industrial problems. The steel-mill scheduling problem is interesting in that it has a variety of constraints. Some are defined on contiguous processing items. For example, one type of constraint requires that no more than forty slabs can be rolled in 3-inch width difference. Another type of constraint is defined on non-contiguous processing items, for example, there should be at least seven hours of gap between two groups of ultra low carbon slabs.

As an early effort to produce a feasible schedule for the first scheduling problem, we tried the forward checking algorithm, the best hybrid search algorithm known so far. The result, as expected, was unsatisfactory, in many cases, it failed to find even one solution in over ten hours on an IBM 3090 mainframe, using Common Lisp in VM/CMS.

The edge-labeling sequencing algorithm has been applied to two steel scheduling problems. In each case it was fully implemented and evaluated.

It was first used in the sequencing system for the twin-strand continuous casting machines. It was implemented in the Common Lisp programming language for the prototype; later, it was rewritten in another AI language for a production version. This scheduler can generate thousand sequences in less than four seconds on an IBM mainframe; its runtime speed outperforms all other approaches. In addition to the speed, the quality of the sequences was evaluated to be outstanding.

As the second application, the sequencing algorithm was recently used as the core sequencing algorithm for an exploratory steel scheduling project. It is written in C++ on an IBM RS/6000 workstation. CAP has around 5000 input order items from which many production sequences are generated. To cope with the large input number, segments are created after two successive applications of the algorithm. It takes around ten minutes (elapsed time) on the same workstation to create sequences at the casting and rolling machines.

For the two difficult scheduling problems, the results are so impressive that many solutions can be found, where previously even a single solution was considered difficult, if not impossible, to obtain.

Figure 5A:
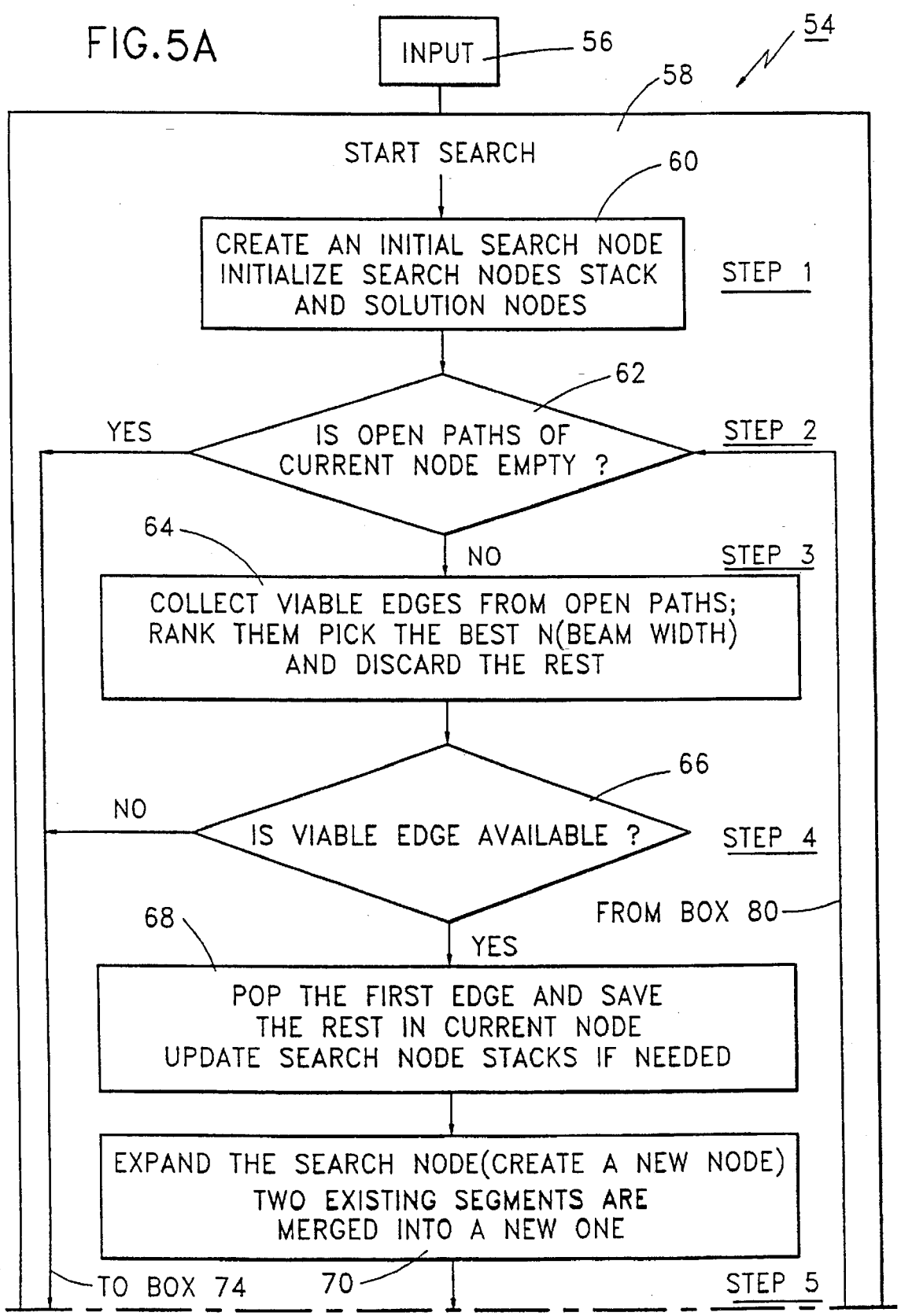
FIGS. 5A and 5B, taken together, are a flow chart of a computer implementation of a preferred aspect of the present invention.
Figure 5B:
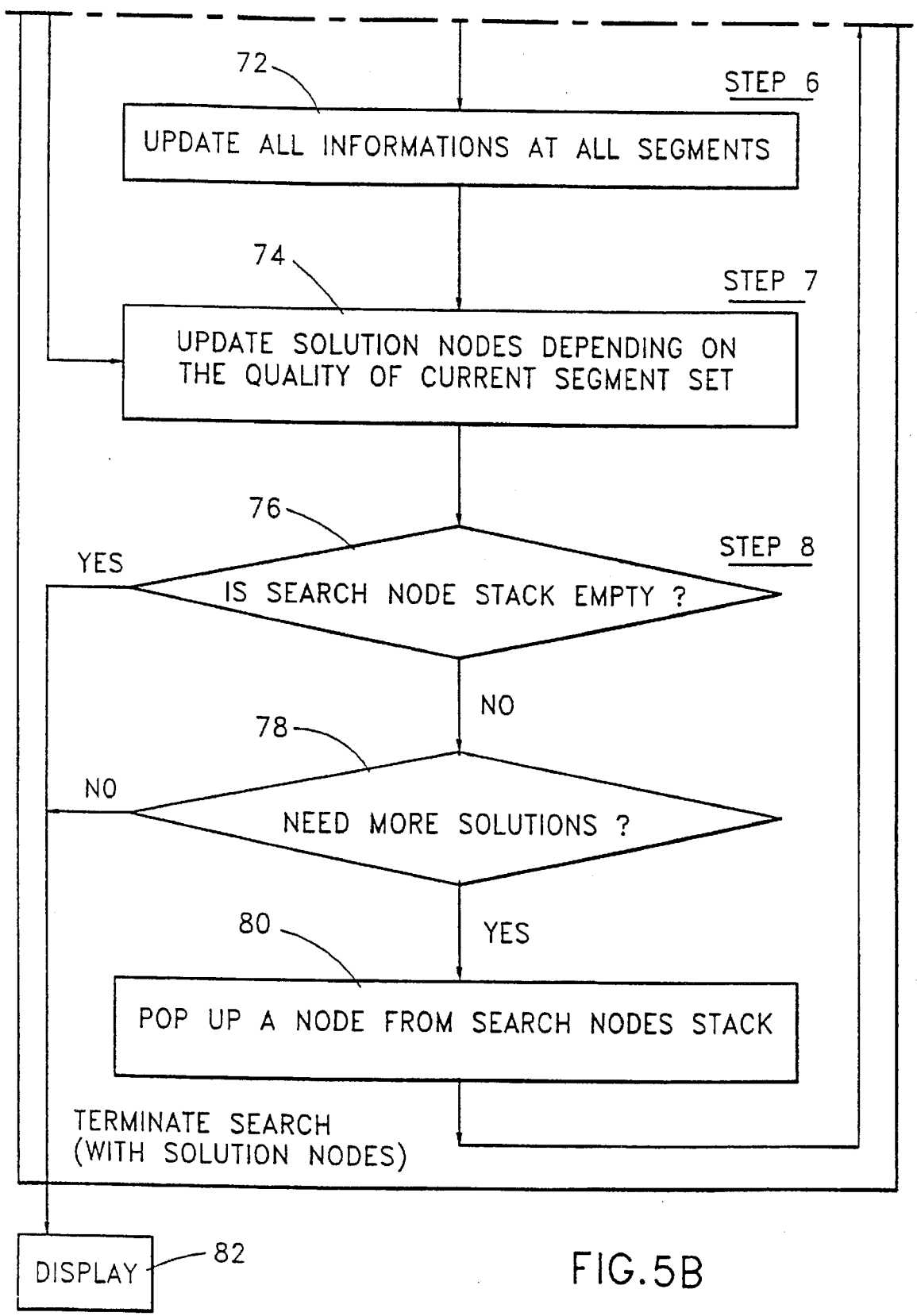

FIG. 5A and 5B illustrate a typical such computer implementation. Note that a conventional input device 56 can receive information comprising items, constraints and objectives; a computer 58 can operate on the equivalent of the FIG. 3 flowchart and a conventional output display 82 can provide multiple schedules (sets of subsequences); that is, the computer 58 performs the same series of steps as described in the flow chart of FIG. 3.

I claim:

1. A computer implemented method for scheduling items in a production sequence comprising the steps of:

(a) inputting data identifying items, each item having attributes and constraints;

(b) building a segment graph in which items are nodes of the segment graph;

(c) creating an initial search node as a current search node in a search tree in the segment graph and initialize a search nodes stack;

(d) finding open and closed paths of the current search node as multiple sets of subsequences wherein a subsequence comprises one or more nodes of the segment graph linked by an edge according to attributes of the linked items and so as not to violate any relevant constraints of the linked items;

(e) determining if there are any open paths in the current search node, if not, going to step (j), but otherwise continuing;

(f) from a set of segments in the open paths, collecting all edges and ranking them according to a merit that is evaluated by the segment graph structure as well as by a domain objective and from this ranking finding the best N edges where N is a beam width and saving the best N edges in sorted order in storage;

(g) determining if there are viable edges in the current search node and, if not, going to step (j), but otherwise popping the first best edge from storage and pushing it on a search nodes stack for future alternative search paths;

(h) expanding the search tree by creating a new search node in the segment graph, the selected edge concatenating two existing segments into one while creating a new segment in the segment graph;

(i) updating all existing and newly created segments by constraint propagation;

(j) getting aggregate sizes of open and closed paths and if smallest in the search, setting to a solution nodes file, but if same as previous smallest, then adding to the solution nodes file;

(k) determining if the search nodes stack is empty or there is a sufficient number of solutions and, if so, terminating the search and exiting to step (l), otherwise popping a node from the search nodes stack and returning to step (e); and (l) displaying the search node file as a result of the search.

2. The computer implemented method for scheduling items in a production sequence recited in claim 1 wherein further comprising the steps of:

limiting the beam width in step (f) to quickly navigate the search; and labeling edges in the segment graph to improve finding a good scheduling solution by limiting a number of resulting segments to less than a predetermined number.

* * * * *